(12) United States Patent
Bodino et al.

(10) Patent No.: US 12,176,507 B2
(45) Date of Patent: Dec. 24, 2024

(54) INK COMPOSITIONS

(71) Applicant: Dover Europe Sarl, Vernier (CH)

(72) Inventors: Frederic Jean Alain Bodino, Lausanne (CH); Melissa Dawn Lee Hudson, Gilsum, NH (US); Paul Xavier Martens, Merrimack, NH (US); Claudiu Neagu, Friborg (CH); Marc Karman, Villars sur Glane (CH)

(73) Assignee: Dover Europe Sàrl, Vernier (CH)

( * ) Notice: Subject to any disclaimer, the term of this patent is extended or adjusted under 35 U.S.C. 154(b) by 0 days.

(21) Appl. No.: 17/913,384

(22) PCT Filed: Mar. 31, 2021

(86) PCT No.: PCT/EP2021/058484
§ 371 (c)(1),
(2) Date: Sep. 21, 2022

(87) PCT Pub. No.: WO2021/198360
PCT Pub. Date: Oct. 7, 2021

(65) Prior Publication Data
US 2023/0144698 A1    May 11, 2023

Related U.S. Application Data

(60) Provisional application No. 63/002,722, filed on Mar. 31, 2020.

(51) Int. Cl.
*H01M 10/6556* (2014.01)
*H01M 10/6555* (2014.01)
*H01M 10/6568* (2014.01)

(52) U.S. Cl.
CPC ... *H01M 10/6556* (2015.04); *H01M 10/6555* (2015.04); *H01M 10/6568* (2015.04)

(58) Field of Classification Search
CPC ....................................................... H01M 4/04
See application file for complete search history.

(56) References Cited

U.S. PATENT DOCUMENTS

| | | | | |
|---|---|---|---|---|
| 4,694,062 A * | 9/1987 | Jenekhe | ............... | C08G 61/123 528/265 |
| 4,781,443 A * | 11/1988 | Giles | ............ | H01M 4/60 252/500 |
| 6,598,954 B1 | 7/2003 | Moffat et al. | | |
| 2012/0097900 A1 | 4/2012 | Okamoto et al. | | |
| 2020/0090874 A1 * | 3/2020 | Kawamoto | ............... | H01G 9/15 |

FOREIGN PATENT DOCUMENTS

| | | |
|---|---|---|
| CN | 102471592 | 5/2012 |
| CN | 106046371 | 10/2016 |
| EP | 2211240 | 7/2010 |
| EP | 2211240 A1 | 7/2010 |
| EP | 2452982 | 5/2012 |
| EP | 2452982 A1 | 5/2012 |
| JP | 2000191971 | 7/2000 |
| WO | 2003018648 | 3/2003 |
| WO | WO03018648 | 3/2003 |

OTHER PUBLICATIONS

Foitzik et al., "Soluble poly-3-alkylpyrrole polymers on films and fabrics 11," Synthetic Metals, Oct. 15, 2005, 155(1): 6 pages.
Foitzik et al., "Synthesis, polymerization and wool coating studies of 3-iso-butylpyrrole and 3-iso-pentylpyrrole11," Synthetic Metals, Dec. 1, 2006, 156(21-24):1333-1340.
International Preliminary Report on Patentability in International Appln. No. PCT/EP2021/058484, mailed on Oct. 13, 2022, 9 pages.
International Search Report and Written Opinion inInternational Appln. No. PCT/EP2021/058484, mailed on Oct. 28, 2021, 19 pages.
Kaeriyama et al., "Synthesis and properties of 3-substituted polypyrroles11," Synthetic Metals, Apr. 30, 1991, 41(1-2):389-392.
Shi et al., "Electrochemical copolymerization of pyrrole and propylene oxide," Journal of Applied Polymer Science, Sep. 6, 2003, 89(10): 2624-2627, 4 pages.
International Preliminary Report on Patentability in International Appln. No. PCT/EP2021/058484, mailed on Oct. 13, 2022, 9 pages.
Kaeriyama K et al: Synthesis and properties of 3-substituted polypyrroles11 , Synthetic Metals, Elsevier Sequoia Lausanne, CH, vol. 41, No. 1-2, Apr. 30, 1991 (Apr. 30, 1991), pp. 389-392, XP024170530, ISSN: 0379-6779, DOI: 10.1016/0379-6779(91)91089-S; 4 pgs.
Foitzik R C et al: Soluble poly-3-alkylpyrrole polymers on films and fabrics 11 , Synthetic Metals, Elsevier Sequoia Lausanne, CH, vol. 155, No. 1, Oct. 15, 2005 (Oct. 15, 2005), 6 pgs.
Shi Chenjun et al: Electrochemical copolymerization of pyrrole and propylene oxide, Journal of Applied Polymer Science, vol. 89, No. 10, Sep. 6, 2003 (Sep. 6, 2003), pp. 2624-2627, XP055852327, 4 pgs.
Foitzik RC et al: Synthesis, polymerization and wool coating studies of 3-iso-butylpyrrole and 3-iso-pentylpyrrole11 , Synthetic Metals, Elsevier Sequoia Lausanne, CH, vol. 156, No. 21-24, Dec. 1, 2006 (Dec. 1, 2006), pp. 1333-1340, XP027940296, ISSN: 0379-6779, 8 pgs.
International Search Report/Written Opinion dated Oct. 28, 2021 issued by European Searching Authority; 19 pgs.
Non-hydrocarbon compounds in petroleum and petroleum products, 1st ed., C. Liu (ed.), Jun. 1991, 429, 4 pages (with machine translation).
Some Modern Methods of Organic Synthesis. 3rd ed. W. Carruthers (ed.), 1986, 404-405, 5 pages (with machine translation).

* cited by examiner

*Primary Examiner* — William D Young
(74) *Attorney, Agent, or Firm* — Fish & Richardson P.C.

(57) ABSTRACT

This disclosure includes an ink composition that includes a polymer containing a polypyrrole and an organic solvent, in which the composition is a solution and the polymer is in an amount of from about 1% to 70% by weight of the composition. This disclosure also relates to a printing process using such an ink composition and a product containing such an ink composition.

15 Claims, No Drawings

INK COMPOSITIONS

CROSS REFERENCE TO RELATED APPLICATION

This application claims priority under 35 USC § 119(e) to U.S. Provisional Application Ser. No. 63/002,722, filed on Mar. 31, 2020, the entire contents of which are hereby incorporated by reference.

TECHNICAL FIELD

This disclosure relates to polypyrrole polymers, as well as related ink compositions, products, and processes.

BACKGROUND

During ink jet printing, the ink is typically ejected through a component of a printhead (e.g., an array of nozzles) onto a substrate. Many solvent-soluble dyes currently used in the ink jet printing have been identified as toxic materials. These dyes are typically coordinated to heavy metals, which could contribute to the toxicity of such dyes. Thus, there is a need to develop a solvent-soluble dye that does not contain heavy metals.

SUMMARY

This disclosure is based on the unexpected discovery that certain polypyrrole polymers can have a relatively high solubility in an organic solvent and can form a colorant without including any heavy metal. Such a polypyrrole can be used as a black dye in a continuous inkjet (CIJ) printing process or a drop-on-demand (DOD) printing process (e.g., a thermal inkjet (TIJ) printing process). Compared to conventional colorants (e.g., carbon black and metal complexed dyes) used in a printing processes (e.g., CIJ or DOD), the polypyrrole described herein can form a simplified ink composition (e.g., without including a dispersant, a binder, and/or a rheology agent) while still possessing excellent stability, printablility, and adhesion to a variety of substrates.

In one aspect, this disclosure features an ink composition that includes a polymer containing a polypyrrole, and an organic solvent. The composition can be a solution. The polymer can be in an amount of from about 1% to about 70% by weight of the composition.

In another aspect, this disclosure features a product that includes a substrate (e.g., a cardboard, a glass, a metal, or a film) and a solid ink defining an image on the substrate, in which the solid ink includes the ink composition described herein.

In another aspect, this disclosure features a printing process that includes ejecting the ink composition described herein from a printhead in an inkjet printer onto a substrate to form an image.

In another aspect, this disclosure features a polymer that includes a polypyrrole, in which the polypyrrole contains a monomer repeat unit that includes a pyrrole substituted by at least one $C_1$-$C_{20}$ alkyl group as a monomer repeat unit, the $C_1$-$C_{20}$ alkyl group being optionally substituted by OH, aryl, or C(O)R, in which R is $C_1$-$C_4$ alkyl.

In another aspect, this disclosure features a polymer that includes a polypyrrole copolymer, in which the polypyrrole copolymer includes a first polymer unit and a second polymer unit, the first polymer unit includes an unsubstituted polypyrrole, and the second polymer unit includes a substituted polypyrrole, a polyol, a polyether, a polyketone, a vinyl polymer, or a polyolefin.

In another aspect, this disclosure features a method of preparing a polypyrrole polymer that includes (1) mixing pyrrole with a solution containing at least one ketone or aldehyde compound to form an intermediate product; and (2) mixing the intermediate product with at least one oxidizing reagent to form a polypyrrole polymer.

In still another aspect, this disclosure features a method of preparing a polypyrrole copolymer that includes (1) mixing at least one ketone or aldehyde compound with at least one first oxidizing reagent to form an intermediate product; and (2) mixing the intermediate product with pyrrole to form a polypyrrole copolymer.

Embodiments can have one or more of the following features.

In some embodiments, the polypyrrole includes a pyrrole substituted by at least one $C_1$-$C_{20}$ alkyl (e.g., isobutyl) or $C_1$-$C_{20}$ alkylene (e.g., isobutylene) group as a monomer repeat unit, the $C_1$-$C_{20}$ alkyl or $C_1$-$C_{20}$ alkylene group being optionally substituted by OH, aryl, or C(O)R, in which R is $C_1$-$C_4$ alkyl. In some embodiments, the at least one $C_1$-$C_{20}$ alkyl group is at the 3-position, or 4-position, or both the 3- and 4-positions on the pyrrole ring. In some embodiments, the at least one $C_1$-$C_{20}$ alkylene group is at the 2-position, or 5-position, or both the 2- and 5-positions on the pyrrole ring.

In some embodiments, the polypyrrole includes a monomer repeat unit of formula (I) or (II):

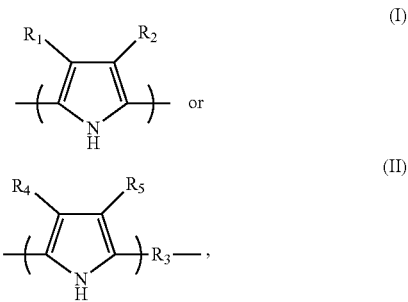

in which each of $R_1$, $R_2$, $R_3$, and $R_4$, independently, is H or $C_1$-$C_{20}$ alkyl optionally substituted by OH, aryl (e.g., phenyl), or C(O)R; $R_3$ is linear or branched $C_1$-$C_{20}$ alkylene optionally substituted by OH, aryl, or C(O)R; and each R, independently, is $C_1$-$C_4$ alkyl. In some embodiments, each of $R_1$, $R_2$, $R_3$, and $R_4$, independently, is H or isobutyl. In some embodiments, $R_3$ isobutylene.

In some embodiments, the polypyrrole includes first and second pyrrole monomer repeat units, and the first pyrrole monomer repeat unit is different from the second pyrrole monomer repeat unit. In some embodiments, the polymer further includes a polyol.

In some embodiments, the second polymer unit in the polypyrrole copolymer includes a substituted polypyrrole. In some embodiments, the polypyrrole copolymer further includes a third polymer unit, wherein the third polymer unit includes a polyol, a polyether, a polyketone, a vinyl polymer, or a polyolefin.

In some embodiments, the polymer has a weight average molecular weight of from about 500 Daltons to about 120,000 Daltons.

In some embodiments, the polypyrrole is in an amount of from about 10 wt % to about 60 wt % of the composition.

In some embodiments, the organic solvent comprises a ketone, an ester, an acetal, an ether, a carbonate, an ester, or a combination thereof. For example, the organic solvent can include methyl ethyl ketone, methyl isobutyl ketone, methyl isopropyl ketone, diethyl ketone, cyclopentanone, acetone, ethyl acetate, methyl acetate, methanol, ethanol, isopropanol, chloroform, dimethylsulfoxide, ethylene glycol, propylene glycol, propylene carbonate, propylene glycol monomethyl ether, or tripropylene glycol monomethyl ether. In some embodiments, the organic solvent is in an amount of from about 30 wt % to about 99 wt % of the composition.

In some embodiments, the ink composition further includes a rheology agent. For example, the rheology agent can include nitrocellulose, cellulose acetate butyrate, cellulose acetate, shellac, a rosin ester, a polyurethane, an acrylic, or a conductive polymer (e.g., polyaniline). In some embodiments, the rheology agent is in an amount of from about 1 wt % to about 30 wt % of the composition.

In some embodiments, the ink composition further includes a dopant. For example, the dopant can include an inorganic acid, a carboxylic acid, a sulfonic acid, an organophosphoric acid, or a salt thereof. Examples of suitable dopants can include hydrochloric acid, sulfuric acid, phosphoric acid, perchloric acid, fluoroboric acid, 4-dodecyl benzene sulfonic acid, triflic acid, trifluoroacetic acid, p-toluenesulfonic acid, hydroxyanthroquinone sulfonic acid, camphor sulfonic acid, a quinone sulfonic acid, phthalocyanine tetrasulfonic acid, a poly(styrene sulfonic acid) or a copolymer thereof, or a salt thereof. In some embodiments, the dopant is in an amount of from about 1 wt % to about 55 wt % of the composition.

In some embodiments, the ink composition further includes a colorant (e.g., a dye or a pigment), a surfactant, a conductive agent, a humectant, or a resin.

In some embodiments, the polypyrrole polymer has a solubility of at least about 1% by weight in an organic solvent at 25° C.

In some embodiments, the ink composition has a conductivity of from about 0 µS/cm to about 8000 µS/cm.

In some embodiments, the ink composition has an apparent viscosity of from about 1 cP to about 25 cP measured at 20° C. and at 60 rpm.

In some embodiments, the ink composition has a surface tension of from about 20 dynes/cm to about 30 dynes/cm at 25° C.

In some embodiments, the at least one ketone compound used in the method of preparing the polypyrrole described herein includes methyl ethyl ketone, methyl isopropyl ketone, methyl propyl ketone, methyl isobutyl ketone, a polyol containing at least one ketone group, or a combination thereof.

In some embodiments, the solution used in the method of preparing the polypyrrole described herein further includes a dopant. In some embodiments, the solution includes methyl ethyl ketone and a polyol containing at least one ketone group.

In some embodiments, the at least one oxidizing agent includes ferric chloride, selenium oxide, benzeneseleninic anhydride, ceric ammonium nitrate ($(NH_4)_2[Ce(NO_3)_6]$), 2,3-dichloro-5,6-dicyano-1,4-benzoquinone, ammonium persulfate, benzoyl peroxide, sodium peroxide, or hydrogen peroxide.

In some embodiments, the mixing step used in the method of preparing the polypyrrole described herein further includes mixing the intermediate product with additional pyrrole.

In some embodiments, the method described herein further includes mixing the intermediate product with a dopant.

In some embodiments, the method described herein further includes mixing the intermediate product with at least one second oxidizing agent. In some embodiments, the at least one second oxidizing agent includes ferric chloride, selenium oxide, benzeneseleninic anhydride, ceric ammonium nitrate ($(NH_4)_2[Ce(NO_3)_6]$), 2,3-dichloro-5,6-dicyano-1,4-benzoquinone, ammonium persulfate, benzoyl peroxide, sodium peroxide, or hydrogen peroxide. In some embodiments, the at least one second oxidizing agent is the same as the at least one first oxidizing agent.

In some embodiments, the method described herein further includes mixing the intermediate product with at least one olefin monomer. In some embodiments, the at least one olefin monomer includes a 4-vinylbenzenesulfonic acid sodium salt.

Other features and advantages will be apparent from the description and from the claims.

DETAILED DESCRIPTION

This disclosure generally relates to polypyrroles (or pyrrole-containing polymers) that can be used as a black dye, as well as related ink compositions, products and processes. As used herein, the terms "polypyrrole" and "polypyrrole polymer" are used interchangeably.

Polypyrrole Polymer

In general, this disclosure features a polypyrrole polymer having a relatively high solubility in an organic solvent. As used herein, a "polypyrrole" or "polypyrrole polymer" refers to a molecule that includes at least two (e.g., at least five, at least 10, at least 15, or at least 20) pyrrole groups, and can be either an oligomer or a polymer. In some embodiments, a polypyrrole mentioned herein can be a homopolymer or a copolymer. In some embodiments, a polypyrrole mentioned herein can include at least one unsubstituted pyrrole group (e.g., a monomer repeat unit of formula (I) described herein when both $R_1$ and $R_2$ are H), at least one substituted pyrrole group (e.g., a monomer repeat unit of formula (I) described herein when one of $R_1$ and $R_2$ is H and the other is a substituent), or both.

In some embodiments, the polypyrrole described herein can include a substituted pyrrole as a monomer repeat unit. For example, the polypyrrole can include a pyrrole substituted by at least one $C_1$-$C_{20}$ alkyl or $C_1$-$C_{20}$ alkylene group (e.g., at least one $C_1$-$C_6$ alkyl or $C_1$-$C_6$ alkylene group), in which the $C_1$-$C_{20}$ alkyl or $C_1$-$C_{20}$ alkylene group is optionally substituted by OH, aryl (e.g., phenyl), or C(O)R, R being $C_1$-$C_4$ alkyl. The $C_1$-$C_{20}$ alkyl can include linear or branched alkyl groups that include 1-20 (e.g., 2, 3, 4, 5, 6, 7, 8, 9, 10, 11, 12, 13, 14, 15, 16, 17, 18, or 19) carbon atoms. Examples of $C_1$-$C_{20}$ alkyl group include methyl, ethyl, n-propyl, isopropyl, n-butyl, isobutyl, n-pentyl, isopentyl, and n-hexyl. In some embodiments, the at least one $C_1$-$C_{20}$ alkyl group is at the 3-position, or 4-position, or both the 3- and 4-positions on the pyrrole ring of the substituted pyrrole. In some embodiments, the at least one $C_1$-$C_{20}$ alkylene group is at the 2-position, or 5-position, or both the 2- and 5-positions on the pyrrole ring of the substituted pyrrole.

In some embodiments, the polypyrrole described herein can include at least one type of monomer repeat unit of formula (I):

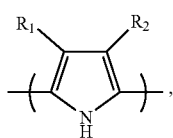

(I)

in which $R_1$ is H or $C_1$-$C_{20}$ alkyl optionally substituted by OH, aryl (e.g., phenyl), or C(O)R, and $R_2$ is H or $C_1$-$C_{20}$ alkyl (e.g., isobutyl) optionally substituted by OH, aryl (e.g., phenyl), or C(O)R, R being $C_1$-$C_4$ alkyl. In some embodiments, one of $R_1$ and $R_2$ is substituted or unsubstituted $C_1$-$C_{20}$ alkyl. In other embodiments, both of $R_1$ and $R_2$ are H or substituted or unsubstituted $C_1$-$C_{20}$ alkyl. In some embodiments, the polypyrrole described herein can include at least two (e.g., three or four) different types of monomer repeat unit of formula (I). In some embodiments, the polypyrrole described herein can include unsubstituted pyrrole as a monomer repeat unit.

In some embodiments, the polypyrrole described herein can include a monomer repeat unit of formula (II):

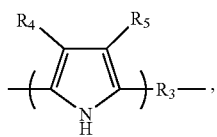

(II)

in which $R_3$ is linear or branched $C_1$-$C_{20}$ alkylene (e.g., isobutylene) optionally substituted by OH, aryl, or C(O)R; each of $R_3$ and $R_4$, independently, is H or $C_1$-$C_{20}$ alkyl optionally substituted by OH, aryl, or C(O)R; and each R, independently, is $C_1$-$C_4$ alkyl. In some embodiments, $R_3$ can be at both 2- and 5-positions of the pyrrole ring. In some embodiments, the polypyrrole described herein can include a monomer repeat unit of formula (II) together with a monomer repeat unit of formula (I) and/or unsubstituted pyrrole as a monomer repeat unit.

In some embodiments, the polypyrrole described herein can be a copolymer, such as a block copolymer, a random copolymer, or a graft copolymer. In some embodiments, the polypyrrole described herein can include first and second pyrrole monomer repeat units, and the first pyrrole monomer repeat unit is different from the second pyrrole monomer repeat unit. In some embodiments, all monomer units in the polypyrrole described herein include a pyrrole group. For example, the polypyrrole described herein can include two or more different substituted pyrroles and optionally unsubstituted pyrrole as monomer repeat units.

In some embodiments, the polypyrrole described herein can include additional monomer repeat units that do not include a pyrrole group. For example, the polypyrrole can be a copolymer containing one or more polypyrroles (e.g., having an unsubstituted pyrrole as a monomer repeat unit or a monomer repeat unit of formula (I) or (II)) and another polymer (e.g., a polyol, a polyether, a polyketone, or a polyolefin (e.g., a substituted polyolefin)). As mentioned herein, a polyol refers to a polymer containing a plurality of hydroxyl groups, in which the hydroxyl groups can be on at least some (e.g., all) of the monomer repeat units. In some embodiments, the polyol can include other functional groups, such as a ketone group. An example of a polyol is TEGO VariPlus SK Resin. Examples of suitable polyolefins include poly(methyl vinyl ketone) and poly(styrenesulfonate)s. In some embodiments, a polyether can be formed from a ketone (e.g., methyl ethyl ketone) that is present when preparing the polypyrrole described herein. For example, the polyether can be a substituted or unsubstituted poly(oxymethylene) (e.g., a poly(oxymethylene) substituted by one or more alkyl groups (e.g., methyl or ethyl)).

In some embodiments, the polypyrrole copolymer can include a first polymer unit and a second polymer unit, in which the first polymer unit includes an unsubstituted polypyrrole, and the second polymer unit includes a substituted polypyrrole (e.g., having a monomer repeat unit of formula (I) when one of $R_1$ and $R_2$ is not H or a monomer repeat unit of formula (II)), a polyol, a polyether, a polyketone, a vinyl polymer, or a polyolefin. In some embodiments, the polypyrrole copolymer can include an unsubstituted polypyrrole as a first polymer unit and a substituted polypyrrole or a polyolefin as a second polymer unit.

In some embodiments, the polypyrrole copolymer can further include a third polymer unit different from the first and second polymer units. In some embodiments, the third polymer unit can contain a polyol, a polyether, a polyketone, a vinyl polymer, or a polyolefin (e.g., a substituted polyolefin). In some embodiments, the polypyrrole copolymer can include an unsubstituted polypyrrole as a first polymer unit and a polyol, a polyether, a polyketone, a vinyl polymer, or polyolefin as a second polymer unit, and optionally a polyol, a polyether, a polyketone, a vinyl polymer, or polyolefin as a third polymer unit. For example, a polypyrrole copolymer can include an substituted or unsubstituted polypyrrole as a first polymer unit, a vinyl polymer (e.g., a polyvinylketone) as a second polymer unit, and optionally a substituted polyolefin as a third polymer unit. Specific examples of polypyrrole copolymers include poly(methyl vinyl ketone)-co-polypyrrole and poly(methyl vinyl ketone)-co-polypyrrole-co-polystyrenesulfonate.

In some embodiments, the polypyrrole described herein can include a polymer unit made from a monomer containing a cationic group (e.g., amino) or an anionic group (e.g., carboxylate, sulfonate, or phosphonate). Examples of such a monomer include styrenesulfonates (e.g., 4-vinylbenzenesulfonic acid sodium salt or sodium 4-styrenesulfonate) and 1-[3-(oxysulfonyl) propyl]-1H-pyrrole. In some embodiments, such a polymer unit can serve as a dopant to increase the conductivity of the polypyrrole and the solubility of the polypyrrole in an organic solvent. Without wishing to be bound by theory, it is believed that because such a dopant is immobilized in the polymer, an ink composition made from such a polypyrrole can have reduced toxicity compared to an ink composition containing a free dopant (i.e., a dopant not incorporated into a polymer).

In some embodiments, the polypyrrole described herein can have a weight average molecular weight of at least about 500 Daltons (e.g., at least about 750 Daltons, at least about 1,000 Daltons, at least about 1,500 Daltons, at least about 2,000 Daltons, at least about 2,500 Daltons, or at least about 3,000 Daltons) to at most about 120,000 Daltons (e.g., at most about 110,000 Daltons, at most about 100,000 Daltons, at most about 90,000 Daltons, at most about 80,000 Daltons, at most about 70,000 Daltons, at most about 60,000 Daltons, at most about 50,000 Daltons, at most about 45,000 Daltons, at most about 40,000 Daltons, at most about 35,000 Daltons, at most about 30,000 Daltons, at most about 25,000 Daltons, at most about 20,000 Daltons, at most about 15,000 Daltons, at most about 10,000 Daltons, or at most about 5,000 Daltons).

In some embodiments, the polypyrrole described herein can be doped with a dopant (e.g., a dopant not incorporated into the polypyrrole). For example, the dopant can be an inorganic acid, a carboxylic acid, a sulfonic acid, an organophosphoric acid, or a salt thereof. Examples of suitable dopant include hydrochloric acid, sulfuric acid, phosphoric acid, perchloric acid, fluoroboric acid, 4-dodecyl benzene sulfonic acid, triflic acid, trifluoroacetic acid, p-toluenesulfonic acid, hydroxyanthroquinone sulfonic acid, camphor sulfonic acid, a quinone sulfonic acid, phthalocyanine tetrasulfonic acid, a poly(styrene sulfonic acid) or a copolymer thereof, or a salt thereof. Without wishing to be bound by theory, it is believed that the dopant can increase the conductivity of the polypyrrole and the solubility of the polypyrrole in organic solvents.

In general, the polypyrrole described herein can have a relatively high solubility in an organic solvent at 25° C. In some embodiments, the polypyrrole can have a solubility ranging from at least about 1% (e.g., at least about 2%, at least about 5%, at least about 10%, at least about 15%, at least about 20%, at least about 25%, at least about 30%, at least about 35%, at least about 40%, at least about 45%, or at least about 50%) by weight to at most about 90% (e.g., at most about 85%, at most about 80%, at most about 75%, at most about 70%, at most about 65%, at most about 60%, at most about 55%, or at most about 50%) by weight in an organic solvent at 25° C. As used herein, the solubility mentioned herein refers to the weight percentage of a solute (e.g., a polypyrrole) based on the total weight of a solution (e.g., a solution containing the solute and an organic solvent) at 25° C. In some embodiments, the polypyrrole described herein is substantially insoluble (e.g., having a solubility less than 0.1 wt % or 0.01 wt %) in water at 25° C.

In some embodiments, the organic solvent in which the polypyrrole described herein can be dissolved can include a ketone, an ester, an acetal, an ether, a carbonate, an ester, or a combination thereof. Examples of suitable organic solvent include methyl ethyl ketone, methyl isobutyl ketone, methyl isopropyl ketone, diethyl ketone, cyclopentanone, acetone, methyl acetate, ethyl acetate, methanol, ethanol, isopropanol, chloroform, dimethylsulfoxide, propylene carbonate, ethylene glycol, propylene glycol, propylene glycol monomethyl ether, and tripropylene glycol monomethyl ether. In some embodiments, the organic solvent can include a single solvent or a combination of two or more (e.g., three or four) solvents.

Method of Making Polypyrrole Polymer

The polypyrrole can be prepared by synthetic methods described herein or those known in the art.

In some embodiments, the polypyrrole described herein can be prepared by a first method that includes (1) mixing pyrrole with a solution containing at least one ketone or aldehyde compound to form an intermediate product; and (2) mixing the intermediate product with at least one oxidizing reagent to form a polypyrrole.

In some embodiments, the at least one ketone compound used in step (1) can include methyl ethyl ketone, methyl isopropyl ketone, methyl propyl ketone, methyl isobutyl ketone, a polyol containing at least one ketone group, or a combination thereof. A commercial example of a polyol containing at least one ketone group is TEGO VariPlus SK Resin available from Evonik Resource Efficiency GmbH (Essen, Germany). In some embodiments, the at least one aldehyde compound used in step (1) can include benzaldehyde. In some embodiments, the solution used in step (1) can include both methyl ethyl ketone and a polyol containing at least one ketone group.

Without wishing to be bound by theory, it is believed that the pyrrole and the ketone or aldehyde compound can react at room temperature (e.g., in the presence of an acid) to form an intermediate product through an aldol condensation reaction. In some embodiments, the acid is a strong acid and can have a pKa (e.g., an estimated pKa) of at most about 1 (e.g., at most about 0.9, at most about 0.8, at most about 0.7, at most about 0.6, at most about 0.5, at most about 0.4, at most about 0.3, at most about 0.2, at most about 0.1, or at most about 0) and/or at least about-5 (e.g., at least about-3). Further, without wishing to be bound by theory, it is believed that the intermediate product can be a substituted pyrrole, such as a pyrrole substituted with a $C_1$-$C_6$ alkyl optionally substituted by aryl or OH. For example, when methyl ethyl ketone is used in step (1), it is believed that the intermediate product can be a pyrrole substituted $C_1$-$C_6$ alkyl optionally substituted by OH. This intermediate product can be polymerized in step (2) to form a polypyrrole that includes substituted pyrrole as a monomer repeat unit. As another example, when TEGO VariPlus SK Resin (e.g., a polyol containing at least one ketone group) is used as a ketone compound in step (1), it is believed that the intermediate product can be a pyrrole bonded or grafted with a polyol. This intermediate product can be polymerized in step (2) to form a polypyrrole-polyol copolymer. Further, without wishing to be bound by theory, it is believed that the addition of an oxidizing agent can oxidize a ketone compound (e.g., methyl ethyl ketone) to form a monomer (e.g., methyl vinyl ketone), which can copolymerize with substituted or unsubstituted pyrrole monomers in the reaction mixture to provide a polypyrrole-polyolefin copolymer, in which the polypyrrole is substituted or unsubstituted and the polyolefin is substituted with $C(O)CH_3$.

In some embodiments, the solution in step (1) can further include a dopant, such as those described herein. Without wishing to be bound by theory, it is believed that including a dopant during the synthesis of a polypyrrole described herein can result in a polypyrrole doped with a dopant.

Examples of suitable oxidizing agents that can be used in step (2) include ferric chloride, selenium oxide, benzeneseleninic anhydride, ceric ammonium nitrate $((NH_4)_2[Ce(NO_3)_6])$, 2,3-dichloro-5,6-dicyano-1,4-benzoquinone, ammonium persulfate, benzoyl peroxide, sodium peroxide, or hydrogen peroxide. Without wishing to be bound by theory, it is believed that the oxidizing agent can facilitate an oxidative polymerization reaction of the pyrrole-containing intermediate product obtained in step (1) to form a polypyrrole of this disclosure.

In some embodiments, step (2) can further include additional pyrrole. In such embodiments, the polypyrrole thus formed can include unsubstituted pyrrole as a monomer repeat unit.

In some embodiments, the at least one ketone or aldehyde compound can be pre-mixed with the at least one oxidizing agent (e.g., ferric chloride) before step (1) above is performed. For example, without wishing to be bound by theory, when methyl ethyl ketone is pre-mixed with an oxidizing agent, it is believed that the methyl ethyl ketone can be oxidized to form methyl vinyl ketone, which can be polymerized to form a poly(methyl vinyl ketone) in the presence or absence of an initiator (e.g., an organometallic initiator or an radical initiator). The poly(methyl vinyl ketone) can then react with the pyrrole mentioned in step (1) above in the presence of an oxidizing agent (e.g., ferric chloride) mentioned in step (2) to form a polypyrrole-poly(methyl vinyl ketone) block copolymer.

In general, the reaction temperature for steps (1) and (2) can be adjusted as necessary. In some embodiments, both steps (1) and (2) can be performed at room temperature. Although step (2) is an exothermal reaction, a coolant for step (2) may or may not be needed depending on the amount of heat released during the reaction.

In general, the reaction time for steps (1) and (2) can be adjusted as necessary. The progress of steps (1) can (2) can be monitored by UV-Vis spectroscopy or thin layer chromatography (TLC) by using methods known in the art.

The resultant polypyrrole can be isolated from the reaction mixture by methods known in the art. For example, the resultant polypyrrole can be isolated by washing the reaction mixture with water and/or a brine solution, separating the organic layer from the aqueous layer, and removing the solvent from the organic layer (e.g., by evaporation).

In some embodiments, steps (1) and (2) above can be combined into one single step. In such embodiments, the synthesis method can include mixing pyrrole with a solution containing at least one ketone or aldehyde compound and at least one oxidizing reagent to form a polypyrrole. In such embodiments, the intermediate product described above may or may not be formed during the reaction.

In some embodiments, the polypyrrole described herein can be prepared by a second method that includes (1) mixing at least one ketone or aldehyde compound with at least one first oxidizing reagent to form an intermediate product; and (2) mixing the intermediate product with pyrrole to form a polypyrrole copolymer. For example, without wishing to be bound by theory, when methyl ethyl ketone is mixed with an oxidizing agent in step (1), it is believed that the methyl ethyl ketone can be oxidized to form methyl vinyl ketone, which can be polymerized to form a poly(methyl vinyl ketone) as an intermediate product in the presence or absence of an initiator (e.g., an organometallic initiator or an radical initiator). The poly(methyl vinyl ketone) can then react with the pyrrole mentioned in step (2) above (optionally in the presence of an oxidizing agent (e.g., ferric chloride)) to form a polypyrrole-poly(methyl vinyl ketone) block copolymer. In such embodiments, the ketone or aldehyde compound and the first oxidizing agent can be those described herein.

In some embodiments, the second preparation method described above can further include mixing the intermediate product with a dopant (such as those described herein). In some embodiments, the dopant can be mixed with the intermediate product either before or after the intermediate product is mixed with the pyrrole. Without wishing to be bound by theory, it is believed that adding a dopant at this stage can result in a polypyrrole doped with a dopant.

In some embodiments, the second preparation method described above can further include mixing the intermediate product with at least one second oxidizing agent (e.g., when the intermediate product is mixed with pyrrole). In some embodiments, the second oxidizing agent includes ferric chloride, selenium oxide, benzeneseleninic anhydride, ceric ammonium nitrate $((NH_4)_2[Ce(NO_3)_6])$, 2,3-dichloro-5,6-dicyano-1,4-benzoquinone, ammonium persulfate, benzoyl peroxide, sodium peroxide, or hydrogen peroxide.

In some embodiments, the second preparation method described above can further include mixing the intermediate product with at least one olefin monomer (such as those described herein). In some embodiments, the at least one olefin monomer can include a cationic group (e.g., amino) or an anionic group (e.g., carboxylate, sulfonate, or phosphonate). Examples of such an olefin monomer include styrenesulfonates (e.g., 4-vinylbenzenesulfonic acid sodium salt or sodium 4-styrenesulfonate). In some embodiments, such an olefin monomer can form a dopant attached to the polypyrrole to increase the conductivity of the polypyrrole and the solubility of the resultant polypyrrole in an organic solvent.

In some embodiments, the methods of preparing a polypyrrole described herein can further include an end-capping agent (e.g., in step (2) of the first and second preparation methods described above). Examples of suitable end-capping agents include hydrides (e.g., acetic anhydride, formic anhydride, or propionic anhydride), acyl halides (e.g., acyl chloride), and alkyl thiols (e.g., 1-dodecanethiol). Without wishing to be bound by theory, it is believed that the end-capping agent can end-cap any remaining active sites of polymerization and prevent further polymer chain growth or crosslinking that could lead to solution/ink instability.

Ink Composition

In general, the polypyrrole described herein can be formulated into an ink composition (e.g., an inkjet ink composition). In some embodiments, the ink composition can be a uniform solution, in which all solutes (include a polypyrrole described herein) are dissolved. In some embodiments, the ink composition can be a dispersion or an emulsion.

In some embodiments, the polypyrrole polymer described herein can range from at least about 1% (e.g., at least about 2%, at least about 5%, at least about 10%, at least about 15%, at least about 20%, at least about 25%, at least about 30%, at least about 35%, at least about 40%, at least about 45%, or at least about 50%) by weight to at most about 70% (e.g., at most about 65%, at most about 60%, at most about 55%, at most about 50%, at most about 45%, at most about 40%, at most about 35%, or at most about 30%) by weight of the ink composition.

Without wishing to be bound by theory, it is believed that the polypyrrole described herein is black in color and therefore can form a black ink composition without using any metal (e.g., any heavy metal) or any colorant. Further, without wishing to be bound by theory, it is believed that an ink composition containing the polypyrrole described herein can have excellent light fastness, color strength, and adhesion properties.

In some embodiments, the ink composition described herein can include an organic solvent in which the polypyrrole is dissolved. In some embodiments, the organic solvent that is suitable for the ink composition can include a ketone, an ester, an acetal, an ether, a carbonate, an ester, or a combination thereof. Examples of suitable organic solvent include methyl ethyl ketone, methyl isobutyl ketone, methyl isopropyl ketone, diethyl ketone, cyclopentanone, acetone, methyl acetate, ethyl acetate, methanol, ethanol, isopropanol, chloroform, dimethylsulfoxide, propylene carbonate, ethylene glycol, propylene glycol, propylene glycol monomethyl ether, and tripropylene glycol monomethyl ether. In some embodiments, the organic solvent can include one solvent or a combination of two or more (e.g., three or four) solvents.

In some embodiments, the organic solvent can range from at least about 30% (e.g., at least about 35%, at least about 40%, at least about 45%, at least about 50%, at least about 55%, at least about 60%, at least about 65%, at least about 70%, at least about 75%, or at least about 80%) by weight to at most about 99% (e.g., at most about 97%, at most about 95%, at most about 90%, at most about 85%, at most about 80%, at most about 75%, at most about 70%, at most about 65%, or at most about 60%) by weight of the ink composition.

In some embodiments, the ink composition described herein can include only two components (i.e., a polypyrrole and an organic solvent) or only three components (i.e., a polypyrrole, a dopant, and an organic solvent). In some embodiments, the ink composition can optionally include one or more (e.g., two, three, or four) additives or additional components.

In some embodiments, the ink composition described herein can optionally include at least one dopant. For example, the dopant can be an inorganic acid, a carboxylic acid, a sulfonic acid, an organophosphoric acid, or a salt thereof. Examples of suitable dopant include hydrochloric acid, sulfuric acid, phosphoric acid, perchloric acid, fluoroboric acid, 4-dodecyl benzene sulfonic acid, triflic acid, trifluoroacetic acid, p-toluenesulfonic acid, hydroxyanthroquinone sulfonic acid, camphor sulfonic acid, a quinone sulfonic acid, phthalocyanine tetrasulfonic acid, a poly(styrene sulfonic acid) or a copolymer thereof, or a salt thereof. The dopant can be added into the ink composition either by including it in the synthesis of the polypyrrole or by including it after the synthesis of the polypyrrole and during the formulation of the ink composition.

In some embodiments, the dopant can range from at least about 1% (e.g., at least about 2%, at least about 5%, at least about 10%, at least about 15%, at least about 20%, at least about 25%, or at least about 30%) by weight to at most about 55% (e.g., at most about 50%, at most about 45%, at most about 40%, at most about 35%, or at most about 30%) by weight of the ink composition. In some embodiments, as the dopant can provide conductivity to the ink composition, the ink composition may not need to include an additional conductive agent for use in a CIJ printing process.

In some embodiments, the ink composition described herein can optionally include at least one rheology agent. Examples of suitable rheology agents include nitrocellulose, cellulose acetate butyrate, cellulose acetate, shellac, a rosin ester, a polyurethane, an acrylic, or a conductive polymer (e.g., polyaniline). In some embodiments, the rheology agent can range from at least about 1% (e.g., at least about 2%, at least about 4%, at least about 5%, at least about 6%, at least about 8%, at least about 10%, or at least about 15%) by weight to at most about 30% (e.g., at most about 25%, at most about 20%, at most about 15%, at most about 10%, or at most about 5%) by weight of the ink composition. Without wishing to be bound by theory, it is believed that adding a rheology agent in the ink composition described herein can increase the viscosity of the ink composition, provide structure for flow and drop formation, promote adhesion, slow or prevent separation of other ink components, and/or modify charge of the ink composition.

In some embodiments, the ink composition described herein can optionally include at least one colorant, such as a dye or a pigment. The dye or pigment can be either an organic or inorganic material. Examples of suitable dyes include anthraquinone and perinone reds such as solvent red 172, solvent red 111, solvent red 222, solvent red 207, and solvent red 135; anthraquinone blues such as solvent blue 104, solvent violet 13; anthraquinone greens such as solvent green 3 and solvent green 5; xanthene, quinoline, quinophthalone, pyrazolone, methine, and anthraquinoid yellows such as solvent yellow 98, solvent yellow 33, disperse yellow 54, solvent yellow 93, disperse yellow 82, and solvent yellow 163. Examples of suitable pigments include pigment blues (PB) 15, 15:3, 15:4, 16, 22, 28, 64, 68; pigment reds (PR) 3, 4, 48, 81, 97, 113, 122, 175, 202, 217; pigment yellows (PY) 2, 7, 53, 111, 155, 151, 175, 194; pigment blacks 7, carbon black, graphite; and pigment white titanium dioxide. Other exemplary dyes or pigments have been described in, e.g., U.S. Pat. Nos. 6,702,884, 5,863,319, and 5,891,228. In some embodiments, the colorant can range from at least about 1 wt % (e.g., at least about 5 wt %, at least about 10 wt %, or at least about 15 wt %) to at most about 25 wt % (e.g., at most about 20 wt %, at most about 15 wt %, at most about 10 wt %, or at most about 5 wt %) of the ink composition. In some embodiments, the ink composition can be substantially free of a colorant other than the polypyrrole described herein.

In some embodiments, the ink composition described herein can optionally include one or more tackifiers. In general, a tackifier can improve adhesion between the ink composition and a substrate (e.g., a cardboard, a glass, a metal, or a film). Examples of tackifiers include glycerol esters, pentaerythritol esters, hydrocarbons, rosin, rosin esters, modified rosin esters (e.g., hydrogenated, acid, or phenolic-modified rosin esters), cumarone-indene polymers, cyclic ketone polymers, styrene allyl alcohol polymers, polystyrenes, polyvinyl toluene/methylstyrene polymers, polyvinyl chloride, polyvinyl alcohol, ethylene/vinyl acetate, ethylene/acrylic acid, alkyl hydrocarbon polymers, aryl hydrocarbon polymers, alkyl aryl hydrocarbon polymers, terpene polymers, ethylene carbon monoxide copolymers, vinyl chloride/vinyl alcohol copolymers, polyvinyl butyral, polyketones, styrene/acrylic copolymers, polybutenes, polybutadienes, styrene-isoprene-styrene, styrene-butadiene-styrene, polyvinyl pyrrolidone, polyvinyl pyridine, vinyl pyrrolidone/vinyl acetate, polyurethanes, polyesters, polyamides, cellulose esters, cellulose ethers, polyols, styrene-acrylates, polypropylene, chlorinated polypropylene, chlorinated paraffin, gilsonite and other asphaltic materials, cyclic hydrocarbon polymer, halogenated polymers, acrylics, epoxides, novolacs, and other synthetic and natural resins. A commercially available tackifier is polyterpene available from Goodyear under the trade name Wingtack 86. In some embodiments, the ink composition contains at least about 1 wt % (e.g., at least about 5 wt %, at least about 10 wt %, or at least about 15 wt %) and/or at most about 25 wt % (e.g., at most about 20 wt %, at most about 15 wt %, at most about 10 wt %, or at most about 5 wt %) of the tackifier.

In some embodiments, the ink composition described herein can optionally include one or more resins (e.g., binder resins). The resin can provide the ink composition with a desired viscosity, thermal stability, flexibility, and adhesion properties. Examples of suitable resins include acacia (gum arabic); gum ghatti; guar gum; locust (carob) bean gum; karaya gum (sterculia gum); gum tragacanth; chicle; highly stabilized rosin ester; tall oil; manila copals; corn gluten; coumarone-indene resins; crown gum; damar gum; p, alpha-dimethylstyrene; gum elemi; ethylene oxide polymer and its adducts; ethylene oxide/propylene oxide copolymer and its adducts; galbanum resin; gellan gum; ghatti gum; gluten gum; guaiac gum; guarana gum; heptyl paraben; cellulose resins, including methyl and hydroxypropyl; hydroxypropyl methylcellulose resins; isobutylene-isoprene copolymer; mastic gum; oat gum; opopanax gum; polyacrylamide; modified polyacrylamide resin; polylimonene; polyisobutylene; polymaleic acid; polyoxyethylene derivatives; polypropylene glycol; polyvinyl acetate; polyvinyl alcohol; polyvinyl polypyrrolidone; polyvinyl pyrrolidone; rosin, adduct with fumaric acid, pentaerythritol ester; rosin, gum, glycerol ester; rosin, gum or wood, pentaerythritol ester; rosin, gum or wood, partially hydrogenated, glycerol ester; rosin, gum or wood, partially hydrogenated, pentaerythritol ester; rosin, methyl ester, partially hydrogenated; rosin, partially dimerized, glycerol ester; rosin, partially hydrogenated; rosin and rosin derivatives; rosin, polymerized, glycerol ester; rosin, tall oil, glycerol ester; rosin, wood; rosin, wood, glycerol ester; purified shellac; styrene; styrene terpolymers; styrene copolymers; sucrose acetate isobutyrate; terpene resins, natural and synthetic; turpentine gum; vinylacetate; vinyl chloride-vinylidene chloride copolymer; xanthan gum; and zein.

In some embodiments, the ink composition includes enough resin to achieve the desired viscosity, stability, flexibility, and adhesion. In some embodiments, the ink composition contains at least about 1 wt % (e.g., at least about 5 wt %, at least about 10 wt %, or at least about 15 wt %) and/or at most about 25 wt % (e.g., at most about 20 wt %, at most about 15 wt %, at most about 10 wt %, or at most about 5 wt %) of the resin. In some embodiments, the ink composition is substantially free of any resin other than the polypyrrole described herein.

In some embodiments, the ink composition described herein can optionally include one or more plasticizers. In general, a plasticizer can reduce the viscosity of the ink composition. Examples of plasticizers include aromatic sulfonamides, phthalates, acetates, adipates, amides, azelates, epoxides, glutarates, laurates, oleates, sebacates, stearates, sulfonates, tallates, phosphates, benzoin ethers, and trimellitates. In some embodiments, the ink composition contains at least about 1 wt % (e.g., at least about 2 wt %, at least about 4 wt %, at least about 6 wt %, or at least about 8 wt %) and/or at most about 10 wt % (e.g., at most about 9 wt %, at most about 7 wt %, at most about 5 wt %, or at most about 3 wt %) of the plasticizer.

In some embodiments, the ink composition described herein can optionally include one or more antioxidants. In general, an antioxidant can inhibit oxidation (e.g., thermally induced oxidation) of the ink composition (e.g., when the ink composition is in a hot molten state during jetting). Examples of antioxidants include butylated hydroxyanisole (BHA); butylated hydoxytoluene (BHT); propyl gallate; tert-butyl hydroquinone (TBHQ); ethylenediaminetetraacetic acid (EDTA); methyl paraben; and propyl paraben. Commercial examples of the antioxidants include Irganox 1010 (i.e., a hindered phenol) and Irgafos 168 (i.e., tris(2, 4-di-tert-butylphenyl)phosphite) available from BASF Corporation (Florham Park, NJ). In some embodiments, the ink composition contains at least about 0.1 wt % (e.g., at least about 0.5 wt %, at least about 1 wt %, or at least about 3 wt %) and at most about 5 wt % (e.g., at most about 4 wt %, at most about 3 wt %, at most about 2 wt %, or at most about 1 wt %) of the antioxidant.

In some embodiments, the ink composition described herein can optionally include one or more dispersants. In general, a dispersant can assist in stabilizing an insoluble component (e.g., a colorant) in the ink composition. For example, the dispersant can prevent agglomeration of a colorant (e.g., a pigment) in the ink composition. Examples of dispersants include Solsperse 13,650, 13,940, 17,000, J910; Byk 108; Tego Dispers 700; UNIQEMA 5543; and EFKA 5244, 5207, 6750; which are all commercially available from Lubrizol; Byk Chemie; Tego Chemie; Croda; and BASF, respectively. In some embodiments, the ink composition contains at least about 1 wt % (e.g., at least about 2 wt %, at least about 4 wt %, at least about 6 wt %, or at least about 8 wt %) and at most about 10 wt % (e.g., at most about 9 wt %, at most about 7 wt %, at most about 5 wt %, or at most about 3 wt %) of the dispersant.

In general, the ink composition described herein can have any suitable apparent viscosity. In some embodiments, the ink composition can have an apparent viscosity ranging from at least about 1 centiPoise (cP) (e.g., at least about 5 cP, at least about 10 cP, at least about 15 cP, or at least about 20 cP) to at most about 25 cP (e.g., at most about 20 cP, at most about 15 cP, or at most about 10 cP) measured at 20° C. and at 60 rpm.

In some embodiments, the ink composition described herein can optionally include one or more conductive agents in addition to the dopant described herein. In some embodiments, the conductive agent can be a salt (e.g., an organic salt or an inorganic salt). For example, the salt can be a quaternary phosphonium salt (e.g., a tetraalkylphosphonium or tetraarylphosphonium salt), a quaternary ammonium salt (e.g., a tetraalkylammonium or tetraarylammonium salt), an imidazolium salt, or an alkali salt (e.g., a Li, Na, K, or Cs salt).

In general, the ink composition described herein can have any suitable conductivity. In some embodiments, the ink composition can have a conductivity ranging from at least about 0 µS/cm (e.g., at least about 10 µS/cm, at least about 50 µS/cm, at least about 100 µS/cm, at least about 200 µS/cm, at least about 300 µS/cm, at least about 400 µS/cm at least about 500 µS/cm, or at least about 1000 µS/cm) to at most about 8000 µS/cm (e.g., at most about 7000 µS/cm, at most about 6000 µS/cm, at most about 5000 µS/cm, most about 4000 µS/cm, at most about 3000 µS/cm, at most about 2000 µS/cm, or at most about 1000 µS/cm). For example, when the ink composition is designed for use in a continuous inkjet printing process, the ink composition can have a suitable conductivity (e.g., 100-8000 µS/cm) to enable the ink composition to be printed in this process. As another example, when the ink composition is designed for use in a thermal inkjet printing process, the ink composition can have zero conductivity since conductivity is not required in this printing process.

In general, the ink composition described herein can have any suitable surface tension. In some embodiments, the ink composition can have a surface tension ranging from at least about 17 dynes/cm (e.g., at least about 18 dynes/cm, at least about 19 dynes/cm, at least about 20 dynes/cm, at least about 21 dynes/cm, at least about 22 dynes/cm, at least about 23 dynes/cm, at least about 24 dynes/cm, or at least about 25 dynes/cm) to at most about 30 dynes/cm (e.g., at most about 29 dynes/cm, at most about 28 dynes/cm, at most about 27 dynes/cm, or at most about 26 dynes/cm).

In general, the ink composition described herein can have any suitable optical density (OD) when printed on a substrate. In some embodiments, the ink composition can have an optical density ranging from at least about 0.5 (e.g., at least about 0.6, at least about 0.7, at least about 0.8, at least about 0.9, at least about 1, at least about 1.1, or at least about 1.2) to at most about 3.5 (e.g., at most about 3, at most about 2.5, or at most about 2). In general, optical density is determined by using a densitometer (e.g., an X-Rite exact instrument) to measure the portion of light reflected by a surface, expressed as the $\log_{10}$ of the reciprocal of the transmittance. In general, the higher the OD number, the more light is absorbed into the printed surface and therefore the ink appears darker. For example, an OD of 0 means no light is absorbed and 100% of light is transmitted; an OD of 1 means 90% of light is absorbed and 10% is transmitted; and an OD of 2 means that 99% of light is absorbed and 1% of light is transmitted.

In some embodiments, the ink composition is substantially free of a certain material. For example, the ink composition can be substantially free of a wax (e.g., a polyethylene wax), a colorant (e.g., a non-polymeric colorant) other than the polypyrrole described herein, a resin (e.g., a non-polymeric resin) other than the polypyrrole described herein, or a conductive agent (e.g., a salt) other than the dopant described herein.

In some embodiments, the ink composition can be a solution (in which all solutes (e.g., a polypyrrole and a dopant) are dissolved) or a dispersion (which contains dispersed particles).

Printing Process and Product

In general, the ink composition described herein can be used in any suitable printing process, including a continuous inkjet (CIJ) printing process, a drop-on-demand printing process (e.g., thermal inkjet (TIJ) printing process or a piezo printing process), a valvejet printing process, a flexographic printing process, a lithographic printing process, a gravure printing process, a screen printing process, or a pad printing process, or an offset printing process. In some embodiments, the ink composition can be used in a printing process that includes ejecting the ink composition (either continuously or on demand) from a printhead in an inkjet printer onto a substrate to form an image.

In some embodiments, in a continuous inkjet printing process, a continuous stream of conductive ink droplets can be ejected from one or more nozzles of a printhead of an inkjet printer. The droplets are electrostatically deflected to address several vertical pixels as the substrate moves relative to the nozzles. Ink droplets that are not intended or needed to form a desired image on the substrate are fully deflected into a gutter and recycled to the ink supply. CIJ inks generally have a suitable conductivity and allows the droplets to be deflected. The process of jetting ink droplets continuously and directing unneeded drops to the gutter allows the CIJ systems to utilize fast evaporating solvents (e.g., those having a relative evaporation rate (RER) greater than 1 as determined by the ASTM method D3359 and relative to n-butyl acetate) without concern for decap (i.e., the ability to remain in the fluid condition in a printhead nozzle opening on exposure to air) and nozzle clogging, as the nozzles are effectively never idle during operation.

In some embodiments, in a continuous inkjet printing process, a continuous ink stream ejected from a printhead is deviated by at least one electrode to which a static or sinusoidal high voltage is applied. Most of the ink stream is not printed and is directed to an ink recovery gutter. During printing, segments of the ink stream are sampled asynchronously, deviated differently depending on their length (the length providing a means of varying the distribution of embedded electrical charge per unit length) and directed towards the substrate. These segments, which can be transformed into spherical drops under the effect of the surface tension, are separated from the jet before they are deflected such that their trajectory is different from the ink stream.

In some embodiments, in a drop-on-demand printing process, inks can be jetted by either thermal inkjet cartridges or piezo drop-on-demand printheads. Examples of thermal inkjet cartridges are those commercially available from Hewlett Packard (such as HP45); Lexmark (such as Model 34); and Olivetti (such as IN501). Examples of piezo drop-on-demand printheads can include commercially available models from Dimatix (such as Q or S Class) and Xaar (such as a XJ500). Examples of thermal inkjet printers that would allow solvent-based inks to be jetted are: DeskJet model 710 from Hewlett Packard, the model Z845 from Lexmark, and the model Simple Way from Olivetti. Examples of piezo-based printers that would allow solvent-based inks to be jetted are: Markem-Imaje models 5200 and 4040. To print inks, an ink is loaded into a reservoir where it is either pumped or fed by gravity to a jetting chamber of a cartridge or printhead. In the case of the thermal inkjet cartridge, a liquid ink is ejected from a printhead by being rapidly heated, causing a rapid phase change from liquid to gas, thus causing a rapid volume expansion and subsequently causing a droplet to eject from an orifice. In the case of a piezo-based device, a liquid ink is ejected from a printhead by activation of a piezo transformer (PZT), which causes a pressure wave to be exerted upon the ink and an ink droplet can be ejected from an orifice. Both devices are referred to as drop-on-demand since a droplet of ink is ejected only when a heater or PZT material is activated. Each cartridge or printhead contains an array of several orifices across its width. Activation of each orifice in such an array is performed methodically by the printer such that an image is formed drop-wise on a substrate, which is positioned a short distance from the orifice array. The printers are designed such that an orifice array and a substrate move relative to one another in order to form an image.

This disclosure also features a product that includes a substrate and a solid ink defining an image on the substrate, in which the solid ink includes the ink composition described herein. The substrate can be any suitable materials (e.g., porous or non-porous materials), such as films, coated papers, plastics, glass, metals, and cardboards. In some embodiments, the substrate can be a package material, such as a cardboard (e.g., a corrugated cardboard) or a film (e.g., a shrink wrap). Examples of suitable substrates include flexible packaging films (e.g., polypropylene, polyethylene, polyethylene terephthalate, polystyrene, or poly(lactic acid) films), rigid plastic materials (e.g., polypropylene, polyethylene, polyethylene terephthalate, polystyrene, poly(lactic acid), polyvinylchloride materials), corrugated cardboard (e.g., bleached, unbleached, and coated cardboard), boxboard (e.g., glossy coated, matte coated, and uncoated boxboards), bottle materials (e.g., glass, polyethylene terephthalate, polyethylene, polypropylene, and poly(lactic acid) materials).

The contents of all publications cited herein (e.g., patents, patent application publications, and articles) are hereby incorporated by reference in their entirety.

The following examples are illustrative and not intended to be limiting.

EXAMPLES

Reagent grade pyrrole obtained from Sigma Aldrich was distilled under reduced pressure at 72-78° C. All other reagents were used as received without further purification. Tetrahydrofuran (THF), 4-dodecyl benzene sulfonic acid (DBSA), acetic anhydride, anhydrous sodium sulfate ($Na_2SO_4$), anhydrous magnesium sulfate ($MgSO_4$), sodium bicarbonate and sodium chloride (NaCl) were obtained from Sigma Aldrich. Anhydrous ferric chloride ($FeCl_3$) was obtained from ACP Chemicals Inc. TEGO VariPlus SK Resin was obtained as a sample from EVONIK. In the sample obtained from EVONIK, most of the ketone groups in this resin have been removed by hydrogenation to render it a polyol. Infrared and $C^{13}$ NMR spectroscopy confirmed the presence of the desired ketone functionality and the ratio of ketones to hydroxyls for stoichiometry. Ethanol, ethyl acetate, butanone, or methyl ethyl ketone (MEK) were obtained from the bulk material used in production at the Keene, NH site from Markem Imaje Corporation. DI water was obtained from the reverse osmosis system in the production facility of Markem Imaje Corporation. Apparent viscosities mentioned herein (reported in cPs) were measured using Brookfield DV2T viscometer at 60 RPM, 20° C., Spindle ULA 0, unless otherwise stated. Nuclear Magnetic Resonance (NMR) Spectroscopy was performed at Keene State College Putnam Science Center on a JOEL 400 MHz DELTA2_NMR.

Molecular weight analyses were performed at the University of Massachusetts Amherst in the Polymer Science and Engineering Department Gel Permeation Chromatography facility.

Example 1: Synthesis of a Polyol-Co-Polypyrrole (Polymer 1)

A beaker fitted with a magnetic stir bar was charged with 1.402 grams (4.288 mmols) of DBSA, as a light amber oil. After 72 mL (1.233 mols) of absolute ethanol was added, the mixture was allowed to stir until a homogenous solution was formed, followed by the addition of 2.862 grams (4.284 mmols) of TEGO VariPlus SK Resin. The beaker was covered with aluminum foil to minimize evaporation and the mixture was allowed to stir at ambient temperature for about 1 hour until the resin was fully dissolved.

Freshly distilled pyrrole (0.6 mL, 8.648 mmols) was added dropwise by syringe to the above solution. As the addition began, a red color formed immediately. By the end of the addition, the mixture was darkly colored. The mixture was allowed to stir for 20.5 hours before the addition of 6.3754 grams (38.916 mmols, 2.25 eq.) of anhydrous ferric chloride and then 0.6 mL (8.648 mmol) pyrrole.

After the reaction mixture was stirred for 5 hours, it was dispersed between ethyl acetate and DI water in a separatory funnel. After drawing off the lower aqueous layer, the organic layer was washed with an additional aliquot of DI water. The upper organic layer was then separated and vacuum filtered.

To determine the ratio of soluble to insoluble product obtained, the insoluble reaction product was collected during vacuum filtration, dried at 57° C. under vacuum (27 inch Hg) to yield only 0.130 grams of insoluble black powder.

The filtrate was dried over anhydrous sodium sulfate, gravity filtered and evaporated under vacuum to yield 5.27 grams of black solid, i.e., Polymer 1. This material was dissolved in MEK at 30%. The apparent viscosity of the 30% solution of Polymer 1 was measured to be 3.3 cPs at 20° C. and 60 RPM using spindle zero on a Brookfield DV2 viscometer. This is within the viscosity range expected to be printable by a CIJ printer without additional formulation. A standard ink P155E measured by this method gave apparent viscosity of 4.23 cPs.

The soluble product was further characterized by UV/Vis spectroscopy. A 0.02% solution in THF gave absorption of 0.72398 at lambda max 492.5 nm.

The soluble product was further characterized by FTIR and NMR spectroscopy: FTIR (ATR) 3562 (free OH), 3431 (NH), 3300 (OH H-bonded), [3107, 3082, 3058, 3026, 3001 (w, aromatic C—H)], [2951, 2924, 2856 (s, aliphatic C—H)], 1710 (m, C=O), 1601 (m, C=C), 1493 (s), 1450 (m), 1369 (m), 1166 (s), 1124 (s), 1033 (s), 1007 (s), 831 (w), 759 (s), 698 (s), 664 (m) cm$^{-1}$.

$^{1}$H NMR (CDCl$_3$, 400 MHZ): δ 7.18 (br, 20H), 5.86 (br, 2H), 4.44 (br, 1H), 1.30 (br, 40H).

$^{13}$C NMR (CDCl$_3$, 400 MHz):
δ 143.7, 140.9, 137.7, 137.5, 136.4, 133.0, 128.1, 127.3, 1267.0, 126.6, 117.7, 107.9, 107.8, 107.0, 103.7, 60.5, 49.0, 45.1, 39.9, 39.2, 39.0, 38.7, 31.9, 29.7, 29.4, 27.7, 27.5, 27.2, 27.0, 26.4, 25.1, 24.5, 24.2, 22.71, 21.1, 14.2.

2D NMR techniques were also employed to characterize the soluble products. In particular, Heteronuclear Multiple Bond Correlation (2D HMBC) confirmed the attachment of the pyrrole monomer to the TEGO Resin SK polyol. The attachment is indicated by a crosspeak at 5.897 ppm (a resonance assigned to the pyrrole proton) and 142.8 ppm for the substituted aromatic carbon in the resin SK.

While the aromatic region of the 13C NMR for Polymer 1 is cluttered by peaks for the DBSA, DBSA did not show a resonance at ~142 ppm in the 13C NMR spectra of the pure dopant, DBSA. However, TEGO Resin SK did show resonance at 142 ppm, which suggest that TEGO Resin SK was bonded to the polypyrrole.

The molecular weights of the polymer were obtained from GPC analysis calibrated using polystyrene standards and is provided below: Polymer 1: Mp 1200, Mn 1203, Mw 2511, Mz 6528, PD 2.0873.

Another batch of Polymer 1 was prepared and evaluated by GPC. The molecular weights were provided below: Polymer 1: Mp 1172, Mn 1267, Mw 1539, 1957, PD 1.2147. The above data was generated by the instrument as it assumes a normal distribution. Peak deconvolution was performed by creating a series of normal curves that add together to match the actual chromatogram. This analysis indicated that the mixture contained species having the following weight average molecular weights and polydispersity: Mw 4884, pdi 1.2; Mw 4307, pdi 2.41; Mw 1305 pdi 1.12; Mw 576, pdi 1.01; Mw 338, pdi 1.02.

The light fade of Polymer 1 was evaluated by drawing down a simple solution in MEK, using a #2 Meyer rod, on Leneta cards, next to the standard ink P155E. The drawdowns were placed in a Pantone color viewer box set to daylight and evaluated over a period of months. The data shows that the level of fade of Polymer 1 was similar to that of the standard ink.

Example 2: Synthesis of a Polypyrrole Copolymer (Polymer 2)

In a beaker fitted with a magnetic stir bar, 28.215 g (86.419 mmol) DBSA was dissolved in 388 mL (4.33 mols) MEK. Freshly distilled pyrrole (6 mL, 86.48 mmol) was added and an immediate color change was noted. After the reaction mixture was stirred for 2.33 hours, the mixture was quite dark. 500 mg aliquot was removed for examination by UV/Vis Spectroscopy.

31.6 grams (194.8 mmol) anhydrous ferric chloride was added to the reaction mixture obtained above. An exothermic reaction was observed and the temperature of the mixture increased from 20.9° C. to 37.9° C. in 10 minutes. A second 500 mg aliquot of the reaction mixture was removed for UV/Vis spectroscopy. After the mixture was stirred for 40 minutes, a third aliquot of the reaction mixture was removed for UV/Vis analysis. The reaction was allowed to proceed overnight (24 hours) before a fourth aliquot was removed for UV/Vis spectroscopy. The conductivity of the reaction mixture was measured using a calibrated Omega CDB387 conductimeter.

The reaction mixture was then poured into 75 mL DI water in a separatory funnel. An additional sample for UV/Vis analysis was taken after contact with water but before further dilution with MEK. The conductivity of the top organic layer was monitored throughout the aqueous workup and the results are shown in the table. The organic layer was washed two additional times with DI water and once with a saturated brine solution which brought the conductivity down to 1576 μS/cm which is in the range of conductivity needed for printing by continuous ink jet.

Table 1

TABLE 1

| Reaction Mixture | 12.08 | mS/cm |
|---|---|---|
| 1st water wash | 10.4 | mS/cm |
| 2nd water wash | 8.51 | mS/cm |
| after separation | 6.85 | mS/cm |
| 3rd water wash | 4.37 | mS/cm |
| after separation | 2.96 | mS/cm |
| After brine wash | 1576 | μS/cm |
| P155E | 1325 | μS/cm |

The dark organic layer was separated, dried over sodium sulfate, gravity filtered and then partially evaporated under reduced vacuum before being poured into a glass pan and allowed to air dry for several days. 50.94 grams of black solid was obtained from the pan and then dried further in the vacuum oven to give Polymer 2.

Thermal gravimetric analysis confirmed that less than 1% VOCs remain in the sample.

A series of dilutions made from this product was evaluated for CIJ ink attributes. The conductivity of this series of diluted solutions (which had a polymer concentration of 0.02-40% by weight) was measured and found to reach a maximum (about 1150 μS/cm) when the polymer concentration was between 20% and 30% by weight of the solution. Without wishing to be bound by theory, it is believed that, when the concentration of the polymer is higher than 30% by weight, the polymer tends to form aggregates which are less mobile and therefore less efficient at conducting.

The surface tension of this series of diluted solutions was measured. It was found that, at a polymer concentration of 1-40% by weight, the surface tension increased with an increase of the polymer concentration and ranged from about 24 dynes/cm to about 25.4 dynes/cm. A change in the slope of this trend was observed around the polymer concentration of 20-30% by weight.

The apparent viscosity of this series of diluted solutions was measured. It was found that, at a polymer concentration of 1-40% by weight, the apparent viscosity increased with an increase of the polymer concentration and ranged from about 0.5 cPs to about 18 cPs.

The soluble product was further characterized by UV/Vis spectroscopy. A 0.02% solution in THF gave absorption of 0.32825 at lambda max 650.2 nm.

FTIR (ATR) 3448 (NH), 3247 (OH), [3 stretches ~3050-3000 (w, aromatic C—H)], [2955, 2921, 2852 (s, aliphatic C—H)], 1706 (m, C=O), 1599 (m, C=C), 1456 (s), 1407 (m), 1376 (m), 1171 (s), 1125 (s), 1033 (s), 1007 (s), 829 (w), 724 (s), 684 (s), 664 (m) cm$^{-1}$.

$^1$H NMR (CDCl$_3$, 400 MHz): δ 7.77 (br, 2H), 7.064 (br, 2.6H (includes some pyrrole), 2.6-0.8 (br, 52H).

The molecular weight of the polymer was estimated by GPC analysis. Polymer 2: MH4-80; Mp 889, Mn 1110, Mw 1768, Mz 2790, PD 1.5928.

Another batch of Polymer 2 was prepared and evaluated by GPC. The molecular weights of Polymer 2 were as follows: Mp 968, Mn 1311, Mw 2250, 3680, PD 1.7162. Peak deconvolution of this GPC chromatogram indicated that the mixture contained species having the following weight average molecular weights and polydispersity: Mw 24066, pdi 7.9; Mw 5408, pdi 1.24; Mw 2137 pdi 1.36; Mw 1493, pdi 1.33; Mw 860 pdi 1.08; Mw 333, pdi 1.01.

Without wishing to be bound by theory, it is believed that Polymer 2 was prepared through the following synthetic reactions:

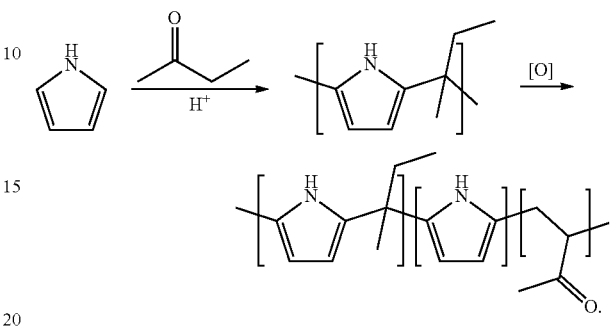

Example 3: Synthesis of a Polyol-Co-Polypyrrole (Polymer 3)

A 2-liter beaker fitted with a magnetic stir bar was charged with 51.76 grams (158.5 mmols) of DBSA, as a light amber oil. 710 mL (7927 mmols) of MEK was added and the mixture was allowed to stir until a homogenous solution was formed, followed by the addition of 11.77 grams (17.6 mmols) of TEGO VariPlus SK Resin. The beaker was covered with aluminum foil to minimize evaporation. The mixture was allowed to stir at ambient temperature four about 1 hour until the resin was fully dissolved.

Freshly distilled pyrrole (11 mL, 158.5 mmols) was added dropwise by syringe to the above solution. As the addition began, a red color formed immediately. By the end of the addition, the mixture was darkly colored. The mixture was allowed to stir for 2.5 hours before the addition of 57.86 grams (356.7 mmols, 2.25 eq) of anhydrous ferric chloride. The mixture was stirred for another 20 hours. After stirring overnight, the reaction mixture was spotted on TLC plate next to benzoyl peroxide to confirm all the pyrrole available for oxidative polymerization was consumed.

Aqueous reaction workup removed water soluble by-products. The undiluted reaction mixture was poured into a separatory funnel containing 150 mL of deionized water. 50 mL of MEK was used to rinse the reaction vessel. The upper organic layer was washed with 3 additional 100 mL aliquots of water and finally a saturated brine solution before drying over anhydrous sodium sulfate.

After gravity filtration through a folded Whatman #4 filter paper to remove the sodium sulfate, the excess solvent in the organic layer was removed under vacuum at about 28 inches Hg (45 mm Hg) or by air drying. The material was further dried in a vacuum oven attached to a high vacuum pump at ~60° C. for several hours. The total yield of black solid polymer (Polymer 3) was 104.1 grams.

MEK solutions made with Polymer 3 were evaluated for CIJ ink attributes. These data are shown below in Table 2 for 2 ink compositions (Inks 3-1 and 3-2) made from 2 lots of Polymer 3 (i.e., Polymers 3-1 and 3-2) compared to a standard CIJ ink P155E.

Table 2

| | Ink 3-1 | | Ink 3-2 | | P155E | |
|---|---|---|---|---|---|---|
| Polymer 3-1 | 7.5 | grams | | | | |
| Polymer 3-2 | | | 7.5 | grams | | |
| MEK (solvent) | 17.5 | grams | 17.59 | grams | | |
| Polymer Concentration | 30% | | 30% | | | |
| conductivity | 1687 | μS/cm | 1584 | μS/cm | 1325 | μS/cm |
| Apparent viscosity | 3.1 | cPs | 2.35 | cPs | 4.23 | cPs |
| Surface tension | 25.203 | mN/m | 25.086 | mN/m | 24.599 | mN/m |
| Optical Density (#2rod) | 1.68 | | 1.87 | | 2.22 | |
| Optical Density (0 rod) | 1.22 | | 1.3 | | 1.66 | |

As shown in Table 2, the ink compositions made from Polymer 3 showed properties similar to the standard CIJ ink P155E and therefore could be used as a CIJ ink.

The soluble product was further characterized by UV/Vis spectroscopy. While the spectra did not indicate an obvious lambda max, the product did appear to be a hybrid of the previous two polymers. A 0.02% solution in THF gave absorption of 0.4938 at 489.78 nm and 0.28282 at 650.2 nm.

FTIR (ATR) 3401, 3260, [3 stretches ~3050-3000 (w, aromatic C—H)], [2955, 2921, 2852 (s, aliphatic C—H)], 1701 (m, C=O), 1649 (m, C=C), 1599, (m), 1494 (w), 1453 (m), 1408 (m), 1376 (m), 1193 (s), 1127 (s), 1047 (s), 1032 (s), 1005 (s), 829 (w), 754 (s), 698 (s), 663 (m) cm-1.

$^1$H NMR (CDCl$_3$, 400 MHz): Since the broad peaks overlap only reporting the ratio of aromatic to aliphatic protons: δ 7.75, 7.25, 7.09 (br, 8H), 2.43-0.8 (br, 40H).

The molecular weights of the polymer were obtained by GPC analysis and were as follows: Polymer 3-1: Mp 1032, Mn 1078, Mw 1551, Mz 2354, PD 1.4388. Another batch of Polymer 3 were prepared and evaluated by GPC. The molecular weights of Polymer 3-2 were as follows: Mp 1010, 1103, 1703, 2839, PD 1.5440. Peak deconvolution was done for Polymer 3-2 and indicated that the mixture contained species having the following weight average molecular weights and polydispersity: Mw 14402, pdi 5.84; Mw 5583, pdi 1.35; Mw 1638 pdi 1.16; Mw 1537, pdi 1.34; Mw 936 pdi 1.08; Mw 332, pdi 1.03.

Example 4: Synthesis and Printing of a Polypyrrole Copolymer (Polymer 2)

In a beaker fitted with a magnetic stir bar, 80.16 g (245.5 mmol) DBSA was dissolved in 1100 mL (12.3 mols) MEK. Freshly distilled pyrrole (17 mL, 245 mmol) was added and an immediate color change was noted. After the reaction mixture was stirred for 3.42 hours, 89.43 g (551.4 mmol) anhydrous ferric chloride was added. After stirring at ambient temperature for 24 hours, the reaction mixture was poured into 600 mL of DI water in a 1 L separatory funnel. To promote separation of the layers, 10 mL of a concentrated brine solution was added. After 2 hours, a dark organic layer had separated. The conductivity of the organic layer was 2.43 mS/cm. A second wash with 600 mL of DI water did not give clean, visible separation of the layers after 3 days. 850 mL was drawn off the bottom of the separatory funnel. A final wash with brine did provide good separation. The organic layer was dried over sodium sulfate and gravity filtered into a tared glass pan. The solvent evaporated until solids began to form on the surface at which point the mixture weighed 300.6 grams. About 60 mL of MEK was added back to the solution before it was filtered through a series of 1 μm syringe filters into a printer cartridge for a Markem-Imaje 9232 CIJ printer. The drying pan was rinsed with additional MEK which was also added to the print cartridge. The final weight of the solution in the cartridge was 402.75 grams. A small aliquot of this solution was removed for analysis; apparent viscosity was 5.13 cPs, conductivity was 1204 μS/cm, and solid percentage was 39.36 wt %.

A Markem-Imaje 9232 CIJ printer was flushed with pure MEK. The flush fluid/diluent loaded in the printer for this experiment was also pure MEK. The print cartridge prepared as described above was loaded into the printer. Using the default printer setup, a stream of drops was observed visually in the printhead, which included a strobe light set to fire at the same frequency as the piezo to allow for visual observation of the ink drops. This observation confirms that Polymer 2 allows for the repeatable drop breakoff required for CIJ printing. A jet speed of 20 m/s was detected by the printer's drop detection system. The experimental ink printed successfully and without additional adjustments.

In addition to coated paper, the ink was printed on a variety of substrates including aluminum foil, a glass slide, and several plastic materials, including the printer cartridge. Good print quality and adhesion was observed on all substrates.

Example 5: Synthesis and Printing of a Polyol-Co-Polypyrrole (Polymer 3)

In a beaker fitted with a magnetic stir bar, 94.12 g (288.27 mmol) DBSA was dissolved in 1291 mL (14 mols) MEK, and the mixture was stirred until a homogenous solution was formed, followed by the addition of 21.49 grams (32.2 mmols) of TEGO VariPlus SK Resin. The beaker was covered with aluminum foil to minimize evaporation. The mixture was stirred at ambient temperature for about 1 hour until the resin was fully dissolved.

Freshly distilled pyrrole (20 mL, 288 mmol) was added and an immediate color change was noted. After 4 hours, 105.45 g (650 mmol) anhydrous ferric chloride was added and the mixture was stirred for 24 hours before being poured into 500 mL of DI water. After 3 washes with DI water, the conductivity of the organic layer was 1563 μS/cm. A portion of this reaction product 5.009 grams was dissolved in absolute ethanol to give 56.322 grams of a solution having a solid content of 8.89%, which had a Brookfield viscosity of 1.9 cPs measured at 20° C. and at 60 RPM. 35 mL of this solution was loaded into an HP 45si cartridge and printed using a Markem-Imaje 1050 TIJ printer. The experimental 2 component ink (i.e., Polymer 3 and ethanol) printed successfully on the first attempt through all nozzles.

Example 6: Formulation and Printing of a Polypyrrole Copolymer (Polymer 2)

An ink was prepared by mixing 81.93 g of Polymer 2 as described in Example 2, 32.82 g of binder (Alnovol PN430 available from Allnex) and 0.94 g of conductivity salt KPF$_6$ in 294.98 g of MEK. The solution was filtered through a 1 μm cartridge filter. The final weight of the solution was 323.75 grams. A small aliquot of this solution was removed for analysis and showed an apparent viscosity of 5.28 cPs and a conductivity of 600 μS/cm.

A Markem-Imaje 9040 CIJ testing platform was flushed with pure MEK. The ink prepared as described above was loaded into the testing platform. Using the default printer setup, a stream of drops was observed visually in the printhead, which included a strobe light set to fire at the same frequency as the piezo to allow for visual observation of the ink drops. This observation confirms that the ink formulated allows for the repeatable drop breakoff required for CIJ printing. A jet speed of 19.8 m/s was detected by the printer's drop detection system. The experimental ink printed successfully and without additional adjustments.

In addition to coated paper, the ink was printed on a variety of substrates including aluminum plate, glass slide, and several plastic materials. Good print quality was observed on all substrates.

Example 7: Synthesis of a Polyvinylketone-Co-Polypyrrole without a Dopant (Polymer 4)

In a beaker fitted with magnetic stir bar, 15.84 g (98 mmol) of anhydrous ferric chloride was dissolved in 104 g (1448 mmol) of 2-butanone. After stirring at ambient temperature for 16.5 hours, 3 mL pyrrole (98 mmol) and 15.864 g (98 mmol) of anhydrous ferric chloride was added. After stirring overnight (29 hours) at ambient temperature, the reaction mixture was poured into 100 mL of DI water in a separatory funnel. The lower aqueous layer was drawn off and the upper organic layer was washed with a second 100 mL portion of DI water. After phase separation, the lower aqueous layer was drawn off and the upper black organic layer was poured into a glass pan and allowed to evaporate in open air to provide 11.58 grams of shiny black solid. A portion of this solid was dissolved in 2-butanone to make a 5 wt % solution which was found to have viscosity of 1.22 cPs at 60 RPM and conductivity 2430 microSiemens/cm. Karl Fisher titration showed the mixture contained 0.06% water. A drawdown of the solution was made with a #0 Meyer rod and the optical density was measured with and X-Rite spectrophotometer to be 0.46.

UV/Vis: A 0.02% solution gave absorbance of 0.776 at 510 nm, lambda max 390 nm (abs 1.37).

FTIR (ATR): 3398, 2969, 2933, 2877, 1701, 1600, 1450 (s,) 1377 (s,) 1215, 998, 864, 591 cm$^{-1}$.

Without wishing to be bound by theory, it is believed that Polymer 4 was prepared through the following synthetic reactions. Further, without wishing to be bound by theory, it is believed that the product shown in the reaction scheme below represents the main components of Polymer 4 and it is possible that other copolymer units (e.g., a substituted pyrrole (such as a pyrrole substituted by one or more isobutyl) or a polyether formed by head to tail polymerization of the ketone) can be present in Polymer 4.

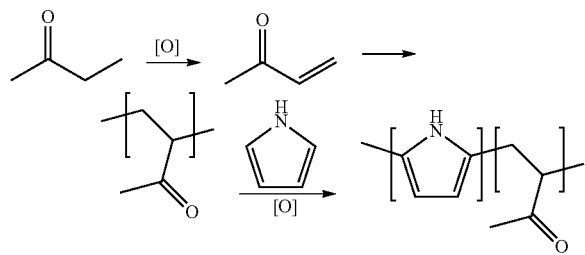

Example 8: Synthesis of an Endcapped Polyvinylketone-Co-Polypyrrole (Polymer 5) with a Dopant In a 100 mL 2-neck flask fitted with a reflux condenser, 5.74 g (35.4 mmol) anhydrous ferric chloride and 30 grams (422 mmol) MEK were heated to 40° C. for 4 hours and then cooled to 25° C. The reaction flask was purged with nitrogen for 20 minutes before the addition of 1 ml (14.4 mmol) pyrrole, followed by 8.29 g (25.4 mmol) DBSA dissolved in 8.9 g (123.5 mmol) MEK. A second portion of 1 ml (14.4 mmol) pyrrole was added after another 20 minutes, followed by a second portion of ferric chloride in an amount of 8.67 g (53.5 mmol) added as a dry powder under positive nitrogen pressure. The reaction mixture was held at 25° C. overnight. After 17 hours, 0.9 mL (9.52 mmol) acetic anhydride was added. After an additional 5 hours at 25° C., the reaction mixture was poured into 100 mL DI water. The reaction flask was rinsed into a separatory funnel with MEK. The first aqueous wash was light yellow, pH 0.32 and was pulled off and discarded. A second water wash had a pH of 1, was neutralized up to pH 5.3 with 10 grams saturated sodium bicarbonate and was returned to the separatory funnel. After separation, the aqueous layer had a pH of 1.5. The organic layer had a conductivity of 1193 microSiemens/cm. An additional 6 mL saturated sodium bicarbonate was added to the aqueous layer before it was returned to the separatory funnel containing the dark organic layer. After swirling, the two phases separated again and the lower aqueous layer had a pH of 4.89. The organic layer was separated, and the solvent was evaporated to give 14 grams of a black solid (Polymer 5). The mass of the product recovered is greater than the mass of pyrrole and DBSA utilized, which indicates a significant amount of MEK has been incorporated into the product.

FTIR (ATR) (MH5-162-AN): 3231, 2959, 2924, 2872, 2855, 1710, 1663, 1600, 1495, 1457, 1409, 1377, 1309, 1224, 1172, 1127, 1051, 1036, 1010, 830, 769, 724, 684, 669, 637, 617 cm$^{-1}$.

The viscosity of a 29% solution of this product was measured at various speeds. A Brookfield viscometer at 20° C. was set to give a single point reading after spinning a #0 spindle in the mixture for 2 minutes. Increasing the spinning rate of the spindle increased the shear force and, as the shear force increased, the viscosity measurement decreased, indicating the polymer solution is shear-thinning: 63 cP at 0.6 RPM, 20.6 cP at 6 RPM, 17.5 cP t 12 RPM, 13.4 cP at 30 RPM. Extrapolation of this trend indicated a viscosity of 12 cP at 60 RPM, but this was outside the capability of the viscometer. The same 29% solution was drawn down on 2A Leneta cards with a #2 Meyer rod. The average optical density measured in 9 places on 3 such draw-downs was 1.52.

A 21% solution of this product was prepared and the OD and viscosity evaluated similarly. Viscosity: 83 cP at 0.6 RPM, 16.8 cP at 6 RPM, 11.0 cP 12 RPM, 7.0 cP at 30 RPM, 5.3 cP at 60 RPM. OD: 1.11.

Example 9: Synthesis of an Endcapped Polyvinylketone-Co-Polypyrrole (Polymer 5) Without a Dopant In a 2 neck round bottom flask fitted with a reflux condensor 5.76 g (53 mmol) anhydrous ferric chloride was combined with 32 grams (440 mmol) mek at 40° C. and stirred fro 2.5 hours before the addition of 1 mL (14.4 mmol) pyrrole. The reaction vessel was cooled to 25° C. and purged with nitrogen. 11.82 g (164 mmol) mek and 1 mL pyrrole was added followed immediately by 8.8 g (54 mmol anhydrous ferric chloride. The mixtured stirred for 15.5 hours before the addition of 0.9 mL acetic anhydride. After 31 hours the reaction mixture was pouted into 100 ML DI water. A second wash with 75 mL DI water and 15 mL saturated sodium bicarbonate was allowed to separate overnight before the lower aqueous layer pH 5.86 was drawn off. The upper organic layer was vacuum filtered to separate insoluble products from the soluble products. The dark filtrate was dried over magnesium sulfate and evaporated to give 6.4 grams for black solid. While this material was not sufficiently soluble to be evalued as an ink, the product was analyzed by NMR.

Polymer 5; $^1$H NMR (d-DMSO, 400 MHZ): δ 6.05 (s, 6H), 5.38 (m, 9H), 4.79 (m, 1H), 3.18 (m, 3H), 3.08 (s, 3H), 3.01 (s, 3H), 2.4 (m, merged with solvent peak), 2.0 (m, 54H), 1.8 (m, 16H), 1.5 (m, 24H), 0.9 (m, 117H). In particular, Heteronuclear Multiple Bond Correlation (2D HMBC) indicated the endcapping agent acetic anhydride did acylate the polymer. The attachment was indicated by a crosspeak at 6.05 ppm and 201 ppm a carbonyl carbon resonance.

Example 10: Synthesis of an Endcapped Polyvinylketone-Co-Polypyrrole (Polymer 5) With a Dopant A 2 neck 250 mL round bottom flask fitted with a magnetic stir bar was charged with 5.56 grams anhydrous ferric chloride and 55 grams MEK. The flask was fitted with rubber septums and a syringe needle inserted in one septum to allow venting to air and the flask was submerged into a water bath held at 25° C. After stirring for 24 hours, 8.21 grams of DBSA was added to the mixture. After stirring for an hour, 1 mL of pyrrole was added followed by (3 minutes later) 5.49 grams anhydrous ferric chloride. After stirring for 21 hours at 25° C., 3 mL acetic anhydride was added to the reaction flask. After stirring for 5.5 hours at 25° C., the reaction mixture was poured into 100 mL DI water (pH 6.1.)

After swirling in a separatory funnel, the mixture separated quickly and a lower yellow layer (pH 0.4) was drawn off. The conductivity of the dark, top layer was measured and found to be 4 mS/cm. A second 100 mL of DI water was added to the separatory funnel and separation occurred quickly after swirling to give a lower yellow layer (pH 0.9.) Conductivity of the top layer was 2 mS/cm. A third 100 mL DI water was added to the separatory funnel and swirled, and no separation was readily observed. Saturated sodium bicarbonate solution (20 mL) was added to the mixture. Considerable carbon dioxide gas was evolved so careful venting was done while swirling the mixture and it was left to separate over night. The meniscus between the 2 dark layers was observed when the mixture entered the stem of the separatory funnel. A flashlight positioned behind the funnel aids in discerning the miniscus. The lower layer was found to be pH 7.1.

The top layer was dried over anhydrous magnesium sulfate and gravity filtered to give 76.9 grams of an opaque black solution. A 1-gram aliquot of this solution was evaporated to dryness using a rotary evaporator and then in the vacuum oven at 57° C. to give 62.4 mg of shiny black solid. Thermogravimetric Analysis indicated this sample contained less than 1% volatiles. Based on this small sample, the total yield of product was calculated as 4.8 grams.

FTIR (ATR) (MH5-109-AN): 3268, 2963, 2926, 2874, 2857, 1706, 1620, 1456, 1410, 1376, 1170, 1126, 1035, 1009, 8745, 832, 789, 724, 700, 684, 668 cm-1.

A portion of the main reaction product (18 g) was retained as a solution for observation. The bulk of the main product was evaporated to dryness yielding 3.7 grams, which was then re-diluted in MEK to make a solution at 26.5% to compare to previous experiment. The viscosity was measured 3 times using a Brookfield DV2 viscometer at 60 RPM, 19.7° C., spindle 0, single point after 2 minutes: 2.07, 2.09, 2.10 cPs. Conductivity of this solution was 28.2 µS/cm.

The viscosity of the 26.5% solution was evaluated at different shear rates to reveal that the solution is shear thinning, which is an important quality for inks, especially jetted inks. The results are summarized in Table 3 below.

Table 3

TABLE 3

| Shear rate (rpm) | Viscosity (cP) |
|---|---|
| 0.6 | 4 |
| 6 | 3.2 |
| 10 | 2.82 |
| 12 | 2.8 |
| 20 | 2.58 |
| 30 | 2.48 |
| 50 | 2.44 |
| 60 | 2.41 |
| 100 | 2.38 |

A 41% solution of this material (12 cPs) was drawn down on 2A Lenata cards using a #2 meyer rod. The optical density of 3 such draw downs was measured using an Xrite spectometer to be 1.1. A 51% solution gave optical density of 2.1.

Example 11: Synthesis of Polypyrrole Copolymer Using Benzoyl Peroxide as Oxidant (Polymer 6)

A 150 ml beaker was charged with 4.71 g (14.45 mmol) DBSA and 52 grams (721 mmol) MEK and 1 ml (14.41 mmol) pyrrole. The reaction mixture turned dark red immediately. After stirring for 2.5 hours, 5.24 grams (21.63 mmol) benzoyl peroxide was added to the reaction mixture. After stirring for 16 hours, the reaction mixture was poured into 100 mL water which separated into 2 layers in a separatory funnel. The lower aqueous layer was drawn off and the dark organic layer was washed with 25 mL DI water and dried over sodium sulfate. After gravity filtration, the solvent was evaporated and the product was dried in a vacuum oven at 140° F. to give 4.787 grams of a black solid. (Polymer 7), which was highly soluble in organic solvents. A 32% solution of the black solid in 2-butanone had viscosity of 3.1 at 60 RPM. Draw downs of this solution made with #2 rod had an average OD of 1.7.

The weight percent yield of this product is 84% based on only the pyrrole and dopant added. This lower yield suggests that less MEK was incorporated into this polymer. In a side experiment, MEK and benzoyl peroxide did not appear to react each other, which supports the conclusion that benzoyl peroxide does not oxidize MEK to MVK (i.e., methyl vinyl ketone) in a manner similar to ferric chloride.

FTIR (ATR): 3227, 3207, 3109, 3091, 3066, 3035, 2963, 2928, 2875, 2858, 1691 (s,) 1605, 1586, 1495, 1453, 1416, 1381, 1319, 1267, 1249, 1211, 1176, 1126, 1115, 1071, 1037, 1027, 1010, 940, 786, 712 (s,) 687, 666, 650, 607 cm$^{-1}$. FTIR shows new peaks in the aromatic C—H stretch region just above 3000 cm$^{-1}$.

Without wishing to be bound by theory, it is believed that Polymer 7 was prepared through the following synthetic reactions. Further, without wishing to be bound by theory, it is believed that the product shown in the reaction scheme below represents the main components of Polymer 7 and it is possible that other copolymer units (e.g., a substituted pyrrole (such as a pyrrole substituted by one or more isobutyl)) can be present in Polymer 7. Lastly, it is believed that phenyl radical from benzoyl peroxide can terminate the polymer chain and further aid solubility.

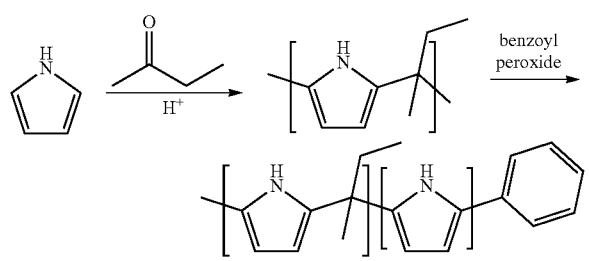

Other embodiments are within the scope of the following claims.

The invention claimed is:

1. A method of preparing a polypyrrole polymer, comprising:
   mixing pyrrole with a solution comprising at least one ketone or aldehyde compound to form an intermediate product; and
   mixing the intermediate product with at least one oxidizing reagent to form a polypyrrole polymer,
   wherein:
      the solution comprises methyl ethyl ketone and a polyol containing at least one ketone group, or
      the at least one oxidizing agent comprises ferric chloride, selenium oxide, benzeneseleninic anhydride, ceric ammonium nitrate ((NH$_4$)$_2$[Ce(NO$_3$)$_6$]), 2,3-dichloro-5,6-dicyano-1,4-benzoquinone, ammonium persulfate, benzoyl peroxide, sodium peroxide, or hydrogen peroxide.

2. The method of claim 1, wherein the solution further comprises methyl isopropyl ketone, methyl propyl ketone, methyl isobutyl ketone, or a combination thereof.

3. The method of claim 1, wherein the solution further comprises a dopant.

4. The method of claim 1, further comprising mixing the intermediate product with additional pyrrole.

5. The method of claim 1, where the solution comprising at least one ketone or aldehyde compound further comprises the at least one oxidizing reagent.

6. A method of preparing a polypyrrole copolymer, comprising:
   mixing at least one ketone or aldehyde compound with at least one first oxidizing reagent to form an intermediate product, wherein the at least one oxidizing agent comprises ferric chloride, selenium oxide, benzeneseleninic anhydride, ceric ammonium nitrate ((NH$_4$)$_2$[Ce(NO$_3$)$_6$]), 2,3-dichloro-5,6-dicyano-1,4-benzoquinone, ammonium persulfate, benzoyl peroxide, sodium peroxide, or hydrogen peroxide; and
   mixing the intermediate product with pyrrole to form a polypyrrole copolymer.

7. The method of claim 6, wherein the at least one ketone compound comprises methyl ethyl ketone, methyl isopropyl ketone, methyl propyl ketone, methyl isobutyl ketone, a polyol containing at least one ketone group, or a combination thereof.

8. The method of claim 6, further comprising mixing the intermediate product with a dopant.

9. The method of claim 6, further comprising mixing the intermediate product with at least one second oxidizing agent.

10. The method of claim 9, wherein the at least one second oxidizing agent comprises ferric chloride, selenium oxide, benzeneseleninic anhydride, ceric ammonium nitrate ((NH$_4$)$_2$[Ce(NO$_3$)$_6$]), 2,3-dichloro-5,6-dicyano-1,4-benzoquinone, ammonium persulfate, benzoyl peroxide, sodium peroxide, or hydrogen peroxide.

11. The method of claim 9, wherein the at least one second oxidizing agent is the same as the at least one first oxidizing agent.

12. The method of claim 6, further comprising mixing the intermediate product with at least one olefin monomer.

13. The method of claim 12, wherein the at least one olefin monomer comprises a 4-vinylbenzenesulfonic acid sodium salt.

14. A method of preparing a polypyrrole copolymer, comprising:
   mixing at least one ketone or aldehyde compound with at least one first oxidizing reagent to form an intermediate product;
   mixing the intermediate product with at least one olefin monomer; and
   mixing the intermediate product with pyrrole to form a polypyrrole copolymer.

15. The method of claim 14, wherein the at least one olefin monomer comprises a 4-vinylbenzenesulfonic acid sodium salt.

* * * * *